United States Patent

[11] 3,593,024

[72] Inventor Lester Katz
 Huntsville, Ala.
[21] Appl. No. 855,004
[22] Filed Sept. 3, 1969
[45] Patented July 13, 1971
[73] Assignee The United States of America as represented by the Administrator of the National Aeronautics and Space Administration

[54] APPARATUS FOR OBTAINING ISOTROPIC IRRADIATION OF A SPECIMEN
 5 Claims, 9 Drawing Figs.
[52] U.S. Cl. ................................................ 250/49.5 B,
 250/49.5 TE, 250/51, 250/52
[51] Int. Cl. .................................................... H01j 37/26,
 H01j 37/20
[50] Field of Search ............................................. 250/49.5
 TE, 49.5 R, 49.5 GC, 49.5 B, 106 R, 52

[56] References Cited
UNITED STATES PATENTS
3,240,934 3/1966 Watanabe ................... 250/49.5

Primary Examiner—James W. Lawrence
Assistant Examiner—C. E. Church
Attorneys—L. D. Wofford, Jr., C. C. Wells, Jr. and G. T. McCoy ABSTRACT: Apparatus for moving a film emulsion in a path of high-energy particles so as to obtain essentially an isotropic exposure. The apparatus rotates the film on a turntable along one axis and simultaneously shifts the turntable up and down within a limited range.

PATENTED JUL 13 1971  3,593,024

INVENTOR
LESTER KATZ

BY
ATTORNEYS 3,593,024

1

APPARATUS FOR OBTAINING ISOTROPIC IRRADIATION OF A SPECIMEN

ORIGIN OF THE INVENTION

The invention was made by an employee of the U.S. Government and may be manufactured and used by or for the Government of the United States of America for governmental purposes without the payment of any royalties thereon or therefor.

1. Field of the Invention

The present invention relates to an apparatus for exposing film emulsions and other radiation-sensitive items and more specifically to an apparatus to simulate isotropic radiation, as one might perceive in space, on a film emulsion from a parallel radiation source.

2. Description of the Prior Art

Films or emulsions are used during spacecraft missions for a variety of scientific purposes. A problem associated with this type of usage arises from the sensitivity of various emulsions to background radiation because storage or use in an environment of relatively intense natural radiation may darken some undeveloped films to the extent that objects in the developed film are not sufficiently detectable. Hence, it has become desirable to test film to ensure that its emulsion sensitivity is properly chosen.

Tests by exposure to high-energy particles emanating from an accelerator, however, does not irradiate film in the isotropic mode found in space since the particles move in essentially parallel paths. Herebefore, there has been no satisfactory way of exposing the film by placing it in a path of high-energy particles and obtaining an isotropic exposure.

SUMMARY OF THE INVENTION

In the present invention, an apparatus is provided which provides a turntable to which a film emulsion is adapted to be fixed. The turntable is motor driven so as to rotate about its center axis and face in the general direction of the parallel radiation source. The turntable is also mounted on a cradle which pivots the turntable up and down in an arc according to an action of a special cam simultaneously with the rotation of the turntable whereby the film emulsion could be exposed in essentially an isotropic manner.

Accordingly, it is an object of the present invention to provide an apparatus for exposing flat sheet film to an essentially isotropic distribution of radiation.

Another object is to provide an apparatus of simplicity to accomplish a difficult feat of obtaining isotropic radiation from a parallel ray source.

Other objects and advantages of the present invention will become more apparent from the following detailed description when taken in conjunction with the accompanying drawings.

2

Figure 1:
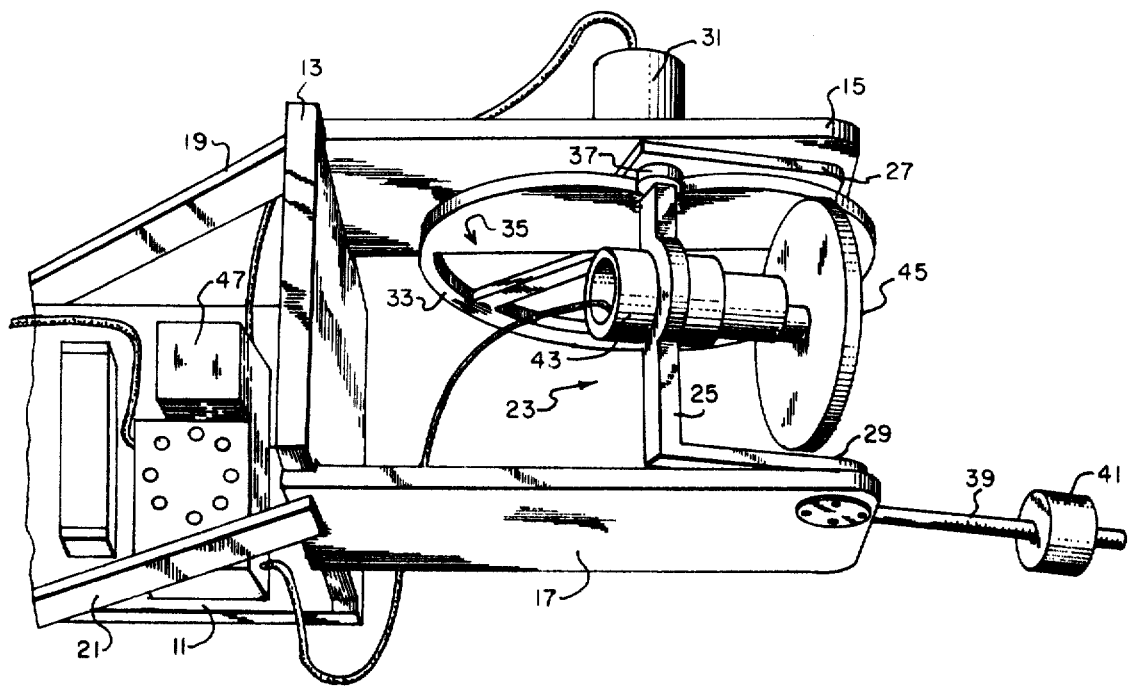
FIG. 1 is a perspective view of the apparatus according to the present invention.
Figure 2:
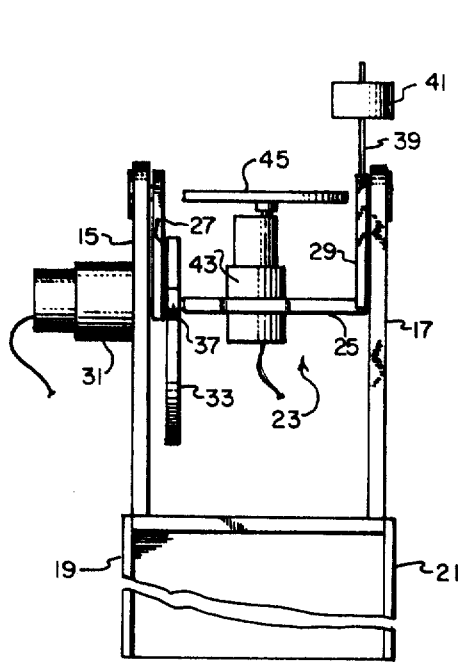
FIG. 2 is a top view of the apparatus of FIG. 1, partly in section for clarity.

Referring now to FIG. 1 wherein is illustrated an apparatus for obtaining isotropic radiation of a film emulsion. The apparatus has a housing defined by a baseplate 11, a middle plate 13 secured to an end of the baseplate and extending vertically therefrom, and two cantilevered arms 15 and 17 extending from the upper end of the middle plate 13 in a direction opposite to the baseplate 11. Diagonal braces 19 and 21 extend from the upper side edges of the baseplate 11 to the side edges of the middle plate 13 to bring rigidity to the housing.

A channel-shaped cradle 23 composed of a crossmember 25 and two end side members 27 and 29 is rotatively mounted between the two support arms 15 and 17. Each side member 27 or 29 is journaled adjacent its forward end to a contiguous arm 15 or 17, respectively. A cylindrical motor 31 extends through the left support arm 15 at a location near where the cradle 23 is at a maximum distance along the support arms from its journaled shafts. The motor 31 has a shaft which supports a cam 33 having a geometry in the shape of a modified cardioid, the cam 33 being balanced at the shaft's center by removing portions 35 of its interior.

The cradle 23 has a roller or wheel 37 journaled onto the crossmember 25 adjacent the left-side arm 15, which rides on the edge surface of the cam 33 so that the cradle 23 will be caused to move up and down. An elongated shaft 39 extends outwardly from the right-side arm, onto which is threaded a counterbalanced weight 41 which balances somewhat the cradle weight about its pivot points but allows the cradle 23 to be the heavier side whereby it will be pulled down against the cam 33.

A cylindrical motor 43 is centrally located on the crossmember 25 of the cradle 23 and the motor's shaft extends perpendicular to the longitudinal axis of the crossmember 25. A circular turntable 45 is secured to the end of the motor shaft. The film emulsion which is to be isotropically exposed is secured to the flat face of the turntable. The electrical components 47 for the control of the motors 31 and 43 may be fastened to the upper surface of the baseplate 11.

Figures 8, 9:
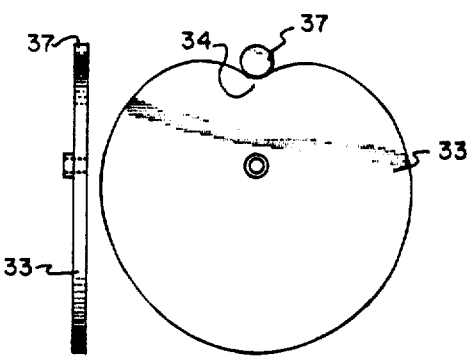
FIG. 8 is a front view of the cam.
FIG. 9 is a side view of the cam.
Figure 5:
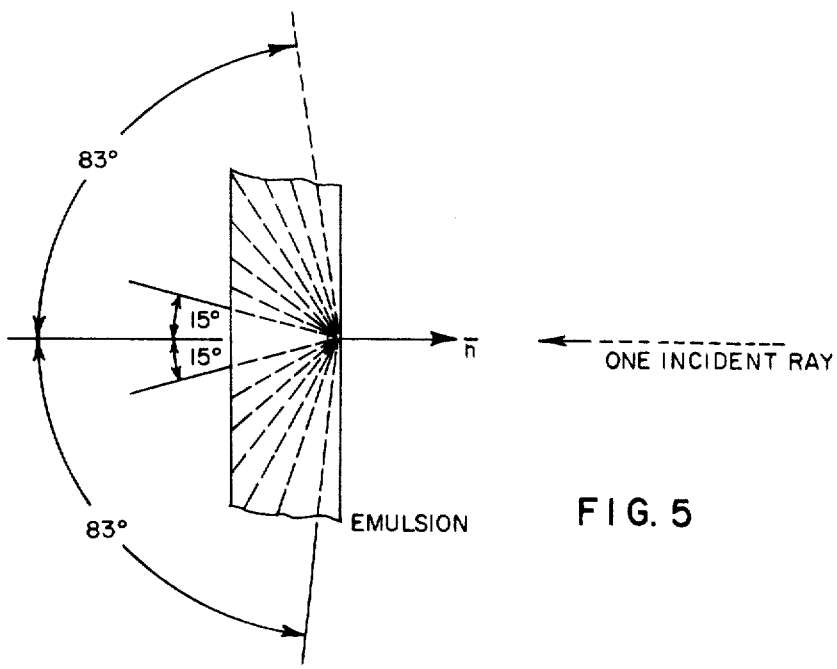
FIG. 5 is a view illustrating the regions of isotropic operation of the apparatus of FIG. 1.

In operation, the cradle roller 37 starts from the cusp 34 of the modified cardioid-shaped cam 33 (see FIGS. 8 and 9), and as the motor rotates the cam 33, the cradle 23 is first swung upwardly, causing the turntable 45 to swing downwardly, and then the cradle 23 is swung downwardly from its peak until it reaches the cam cusp 34, whereupon, the cradle is swung upwardly again. The cam 33 causes the turntable 45 to expose the emulsion within an included angle of ±15° to ±85° as depicted in FIG. 5.

Figure 3:
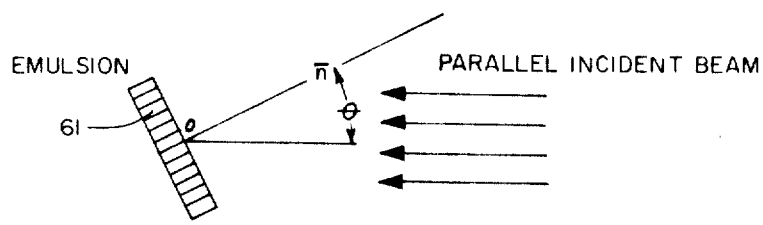
FIG. 3 is a two-dimensional view of parallel incident beam and film emulsion.

The operation of the apparatus will be more fully understood by referring to FIG. 3 which shows a film emulsion 61 receiving parallel incident radiation while the emulsion 61 is rotated about an axis through point $\underline{o}$, perpendicular to the plane of the drawing. The unit normal ($\bar{n}$) is shown at the emulsion's polar axis of symmetry. If the angle which the parallel beam makes at any time with $\bar{n}$ is $\theta$, then the intensity of the beam upon the flat emulsion will be $N \cos \theta / A$, where $N$ = number of protons per second and $A$ = area of parallel beam. Since it is desired that the time rate of change of the intensity to be constant so as to imply an isotropic flux, the relationship is expressed using differential calculus as follows:

$$\frac{d(N \cos \theta / A)}{dt} = \text{constant}$$

$$\frac{d (\cos \theta)}{dt} = \frac{A}{N} \times \text{constant}$$

so that $$\frac{d\theta}{dt} = \frac{C}{\sin \theta},$$

where C is another constant.

The symbol $t$ represents time measured in seconds. The quantity $d\theta/dt$ is the relative angular velocity at $\theta$ which the emulsion must have about a perpendicular through point $o$ so that the parallel incident beam can be effectively seen as an isotropic distribution. This velocity profile is generated by the special cam and follower mechanism shown in FIG. 1 as will be explained further hereafter.

Figure 4:
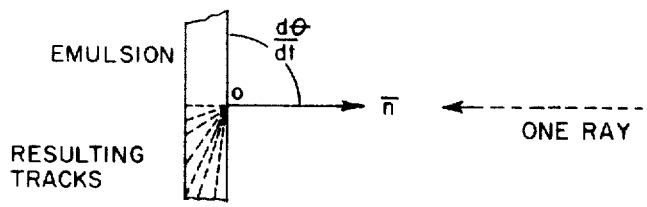
FIG. 4 is an enlarged view of radiation tracks in a film emulsion from one incident ray.

An application of the branch of mechanical engineering known as kinematics of machinery shows that the cam 33 will be able to continuously cycle the emulsion at most, from only $\theta=0$ to 90° and return. FIG. 4 illustrates this mode of operation and shows the radiation tracks caused by one ray.

While obviously, the 0° to 90° sweep is not an adequate isotropic distribution, if the emulsion is rotated at a constant velocity about its polar axis (coincident with $\bar{n}$) as the emulsion is simultaneously rotated about point $o$ with the velocity $d\theta/dt$, the tracks will have a three-dimensional isotropic distribution, limited to half-space exposures.

The cam 33 of FIG. 1 provides the $d\theta/dt$ angular velocity to the cradle 23, which rocks the turntable 45 and its attached emulsion. The turntable motor 43 simultaneously spins the emulsion about $\bar{n}$.

The cam profile, a modified cardioid, is developed from the previously derived equation $d\theta/dt = c/\sin\theta$. Assuming $C = 1$, the following integral equation can be set up, with the subscript "$o$" meaning initial.

$$\int_{t_o}^{t} c\,dt = \int_{\theta_o}^{\theta} \sin\theta\,d\theta$$

with its solution $$t - t_o = \frac{\cos\theta_o - \cos\theta}{C}$$

Figure 6:
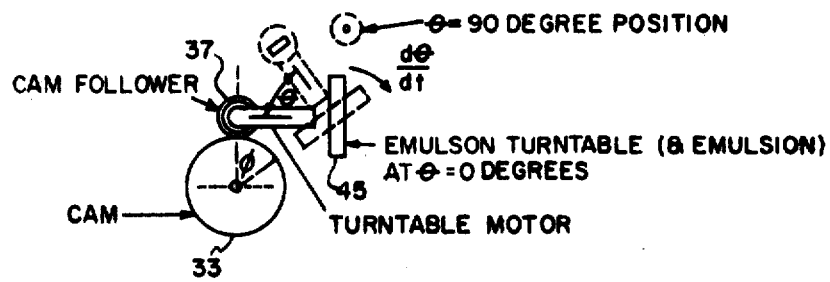
FIG. 6 is a view illustrating schematically the operation of the cam follower and emulsion turntable.
Figure 7:
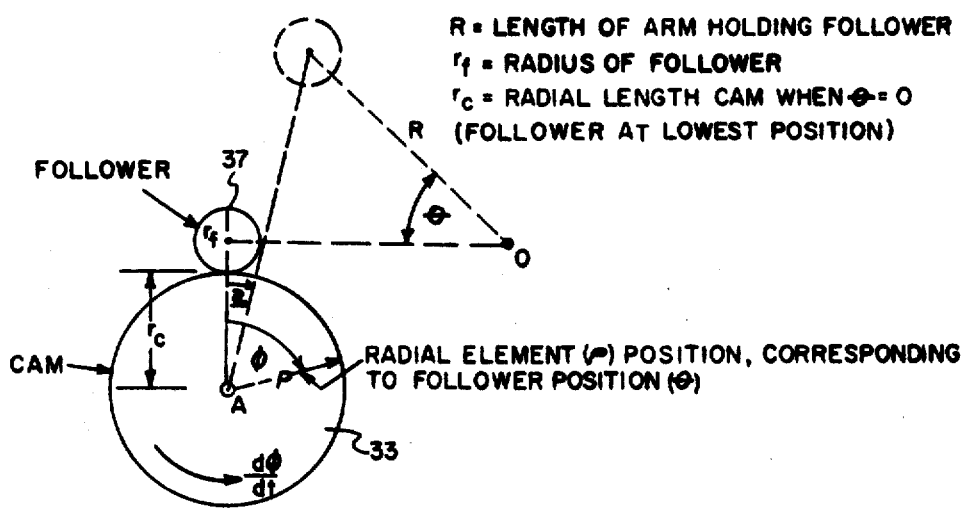
FIG. 7 is a view illustrating the derivation of the cam-follower geometry.

Then, for an excursion of $o \leq \theta \leq 90°$ the choice of $C=1$ implies a rotation of the emulsion from 0° to 90° in 1 second (see FIG. 6). Once the mechanism has been designed on this unit basis it may be operated at any multiple of this speed and with apparatus of FIG. 1, a cam rotation of 10 r.p.m. and turntable rotation of 350 r.p.m. are the nominal operating speeds. If $\Phi$ is the angle which any radial line from the center of rotation of the cam 33 makes with that vertical radial line corresponding to the follower position at $\theta=0°$, then $d\Phi/dt=K$, where $K$ is the angular speed of the cam motor.

FIG. 6 depicts the essential geometry of the cam 33 and follower 37. When the cam 33 has rotated $\Phi°$, the follower is at $\theta°$. However, the follower 37 does not lie vertically above $A$, the cam center, but is at a lag angle $a$ from the vertical. This angle is given by $$a = \tan^{-1}\frac{R - R\cos\theta}{R\sin\theta + r_f + r_c}$$

where $R$ = length of arm-holding follower
$r_f$ = radius of follower
$r_c$ = radial length of cam when
$\theta = 0$ (follower at lowest position)

The length of the radial cam element corresponding to follower position is $$P = \frac{R - R\cos\theta}{\sin a} - r_f$$

From the former equation for $a$ $\sin a = R(1-\cos\theta)/[(R-R\cos\theta)^2 + (R\sin\theta + r_f + r_c)^2]^{1/2}$ so that $P = [R^2(1-\cos\theta) + 2R(r_f+r_c)\sin\theta + (r_f+r_c)^2]^{1/2} - r_f$ Thus, at $\theta=0°$, the cam radial element is $P_{0°} = r_c$; and at $\theta=90°$ $P_{90°} = [2R^2 + 2R(r_f+r_c) + (r_f+r_c)^2]^{1/2} - r_f$ If the cam 33 were to turn one revolution while the emulsion turntable 45 rotated 90°, there would be a discontinuity in the cam, since $P_{0°} \neq P_{90°}$. To circumvent this difficulty, the cam 33 is caused to turn one-half revolution for a 90° rotation of the turntable. This leads to a single-axis-symmetry cam 33 which has the profile of a modified cardioid and a cam motor speed of $K=180°/\text{sec}$. For any given $\theta$ position of the follower 37, the lag angle $a$ must be added to $\theta$ in order to obtain the true cam angle $(a+\theta)$ corresponding to the cam radial element $P$ which is in contact with the follower at that instant. Because $$t - t_0 = \frac{\cos\theta_0 - \cos\theta}{C}$$

so that $t = 1\cos\theta$ when $C = 1$, $\theta_o = 0$ degrees, and $t_o =$ seconds.

Also, $\frac{d\Phi}{dt} = K$ yields $\Phi = 180(1 - \cos\theta)$, upon integration and substitution of $t$ and $K$. Thus, a tabulation of the true cam angle $(a+\Phi)$ versus $P$, for all follower positions, may be made for purposes of machining the cam 33.

Since the angular velocity of the follower 37 is $$\frac{d\theta}{dt} = \frac{1}{\sin\theta}$$

the angular acceleration is $$\frac{d^2\theta}{dt^2} = \frac{-\cos\theta}{\sin^3\theta}$$

At $\theta=0°$, the acceleration is infinite. This corresponds to the cusp of a modified cardioid. Since the follower would have to be physically as small as a point to follow the cam profile into the cusp 34 (see FIG. 9), and since the angular acceleration is so large in that region, an engineering trade-off is made which allows the follower 37 to start its motion at $\theta=15°$ instead of 0°. Because of the lag angle $a$, when the cam angle is 180°, the follower angle is 83°. These are the regions of isotropic operation shown in FIG. 5.

Obviously, many modifications and variations of the present invention are possible in light of the above teachings. It is, therefore, to be understood that within the scope of the appended claims, the invention may be practiced otherwise than as specifically described.

What I claim is:

1. An apparatus for obtaining isotropic radiation of a film emulsion, comprising:
   a housing having two spaced-apart supports,
   a channel-shaped cradle defined by a main crossmember with one side member extending from one end and another side member extending from the other end,
   said cradle extending between said two supports with one cradle side member adjacent its distal end journaled to one of the supports and the other cradle side member adjacent its distal end journaled to the other of said supports,
   a cam having an edge surface substantially in the shape of a cardioid,
   power means secured to one of said supports and rotatively supporting said cam between said side members,
   said cam having its edge surface acting against said main crossmember of said cradle so as to cause the cradle to pivot up and down along an arc slightly less than 180° when said cam is rotated by said power means,
   a circular turntable having a center axis parallel to said side members, and a flat face surface extending perpendicular to said side members,
   said flat face of said turntable adapted to support a film emulsion toward a parallel radiation source, and
   a motor means attached to said main crossmember and supporting said turntable for rotation about its center axis.

2. An apparatus as defined by claim 1 wherein said cradle has counterbalance means extending from one cradle side member forwardly of the journal for that side member and housing support.

3. An apparatus as defined by claim 1 wherein said power means rotates said cam at a nominal speed at 10 r.p.m. and said motor means rotates said turntable at a nominal speed at 350 r.p.m.

4. An apparatus as defined by claim 1 wherein said cam pivots said cradle and its turntable along an arc slightly less than 90° for a cam rotation of about one-half revolution.

5. An apparatus as defined by claim 3 wherein said cam pivots said cradle and its turntable along an arc of about 90° for a cam rotation of about one-half revolution.